United States Patent
Yoshikawa et al.

(10) Patent No.: US 10,295,091 B2
(45) Date of Patent: May 21, 2019

(54) THREADED JOINT FOR TUBE

(71) Applicant: JFE Steel Corporation, Tokyo (JP)

(72) Inventors: Masaki Yoshikawa, Handa (JP); Hiroshi Chikatsune, Handa (JP); Kazunari Takahashi, Handa (JP); Takuya Nagahama, Handa (JP); Jun Takano, Handa (JP); Masateru Ueta, Houston, TX (US); Takamasa Kawai, Handa (JP)

(73) Assignee: JFE Steel Corporation (JP)

( * ) Notice: Subject to any disclaimer, the term of this patent is extended or adjusted under 35 U.S.C. 154(b) by 361 days.

(21) Appl. No.: 15/111,544

(22) PCT Filed: Dec. 18, 2014

(86) PCT No.: PCT/JP2014/006321
§ 371 (c)(1),
(2) Date: Jul. 14, 2016

(87) PCT Pub. No.: WO2015/111117
PCT Pub. Date: Jul. 30, 2015

(65) Prior Publication Data
US 2016/0334033 A1 Nov. 17, 2016

(30) Foreign Application Priority Data
Jan. 24, 2014 (JP) .................. 2014-011315

(51) Int. Cl.
*F16L 25/00* (2006.01)
*F16L 15/00* (2006.01)
(Continued)

(52) U.S. Cl.
CPC .......... *F16L 15/001* (2013.01); *E21B 17/042* (2013.01); *F16L 15/06* (2013.01)

(58) Field of Classification Search
CPC ........ F16L 15/001; F16L 15/06; E21B 17/042
(Continued)

(56) References Cited

U.S. PATENT DOCUMENTS 2,154,037 A 4/1939 Eaton
2,992,019 A * 7/1961 MacArthur ......... E21B 17/0423
285/334

(Continued)

FOREIGN PATENT DOCUMENTS

| JP | 7-98082 A | 4/1995 |
| JP | 7-69028 B2 | 7/1995 |
| JP | 2003-529734 A | 10/2003 |

OTHER PUBLICATIONS

Bhardwaj, M, Graphing: independent and dependent variables, Socratic [online], Mar. 2014 [retrieved on Sep. 2, 2018]. Retrieved from the Internet<URL:https://socratic.org/chemistry/ . . . >. (Year: 2014).*

(Continued)

*Primary Examiner* — Greg Binda
(74) *Attorney, Agent, or Firm* — DLA Piper LLP (US)

(57) ABSTRACT

A threaded joint is adapted for tubes where the stress or the strain concentration hardly occur at a threaded corner portion of box side even when the threaded joint receives repeated tensile-compressive forces or repeated bending forces. In a radial seal type threaded joint, tensile efficiency TE (%) defined by a ratio $S_c/S_p$ between a cross-sectional area $S_c$, an area of Critical Cross Section (CCS) including a portion where a tensile stress and a strain become the highest in a tube circumferential cross section of a box and a cross-sectional area $S_p$ of a tube body satisfies formula TE (%)≥2.25×t/ρ+99.9 having a ratio t/ρ between an internal thread height t of the box and a radius of curvature ρ of a corner portion of internally-threaded bottom load surface side.

3 Claims, 4 Drawing Sheets

(51) Int. Cl.
  *E21B 17/042*   (2006.01)
  *F16L 15/06*    (2006.01)
(58) Field of Classification Search
  USPC .................................................. 285/333, 334
  See application file for complete search history.

(56) References Cited

U.S. PATENT DOCUMENTS

| | | | |
|---|---|---|---|
| 3,109,672 | A | 11/1963 | Franz |
| 9,470,345 | B2 * | 10/2016 | Yoshikawa ............ E21B 17/042 |
| 9,982,815 | B2 * | 5/2018 | Kawai ..................... E21B 17/08 |
| 10,024,119 | B2 * | 7/2018 | Tejeda ................. E21B 17/042 |
| 2002/0113436 | A1 | 8/2002 | Verdillon |
| 2012/0043756 | A1 * | 2/2012 | Elder ...................... E21B 17/08 |
| | | | 285/333 |
| 2012/0146327 | A1 | 6/2012 | Watts |
| 2016/0186899 | A1 * | 6/2016 | Besse ................... E21B 17/043 |

OTHER PUBLICATIONS

Extended European Search Report dated Feb. 3, 2017, of corresponding European Application No. 14879716.0.
Japanese Notice of Allowance dated Jun. 7, 2016, of corresponding Japanese Application No. 2014-011315, along with a Concise Statement of Relevance of Office Action in English.

* cited by examiner

*FIG. 3A-Prior Art*
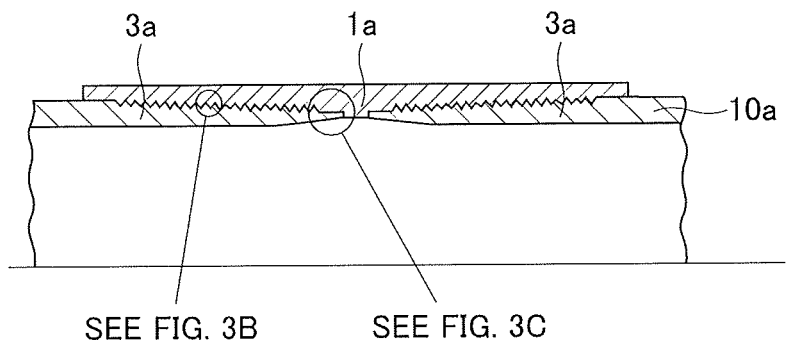
*FIG. 3B-Prior Art*
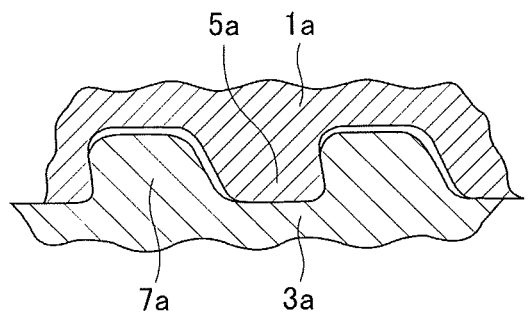
*FIG. 3C-Prior Art*
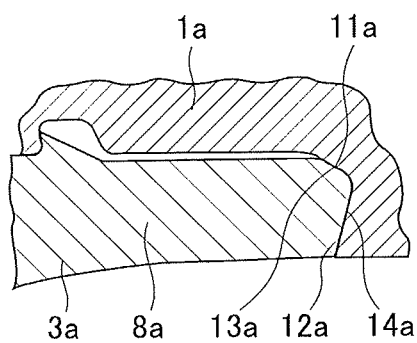

CROSS SECTION A OF FIG. 1A

CROSS SECTION B OF FIG. 1A
TENSILE EFFICIENCY TE: Sc/Sp × 100(%)

THREADED JOINT FOR TUBE

TECHNICAL FIELD

This disclosure relates to a threaded joint for a tube, more particularly, to a threaded joint for a tube having excellent sealability against external pressure and excellent compressive resistance and suitable for the connection of steel tubes such as OCTG (oil country tubular goods) including tubings or casings generally used for search and production of oil wells or gas wells, riser tubes or line tubes.

BACKGROUND

Threaded joints for tubes are popularly used to connect steel tubes used in petroleum installations of oil industry such as oil country tubular goods. In connecting steel tubes used for search and production of oil or gas, conventionally, a standard threaded joint stipulated in API (American Petroleum Institute) standard has been typically used.

However, recently, since deep wells for crude oil or natural gas have been in progress and horizontal wells and directional wells on behalf of vertical wells have been increasing, excavation and production environments are becoming severe. Further, wells developed in an appalling circumstance such as oceans and polar regions have been increasing. Hence, the performance threaded joints have to satisfy is diversified including compression resistance, bending resistance and sealability against external pressure (external pressure resistance). In view of the above, the use of a special threaded joint having high performance referred to as a "premium joint" is increased, and a demand for the improvement in performance of the premium joint is also steadily increased.

The premium joint is a coupling-type joint where an externally-threaded member (hereinafter referred to as "pin") includes a tapered thread, a metal-to-metal seal portion (hereinafter referred to as a seal portion) and a torque shoulder (hereafter referred to a shoulder) and is formed on a pipe end portion, and an internally-threaded member (hereinafter referred to as "box") including a tapered thread, a seal portion (to be more specific, a metal touch seal portion) and a shoulder (to be more specific, a torque shoulder) and connects the pin to each other are joined to each other. The tapered thread is important to firmly fix the tube joint. Bringing the box and pin into a metal contact at the seal portion makes this portion play a role in ensuring sealability. The shoulder forms a shoulder face that functions as an abutment during making up the joint.

FIGS. 3A to 3C are schematic explanatory views of a premium joint for oil country tubular goods, which are vertical cross-sectional views of a threaded joint for a cylindrical tube. The threaded joint includes a pin 3a and a box 1a into which the pin 3a is fitted. The pin 3a has, on the outer surface thereof, an externally-threaded member 7a and a nose (also referred to as a pin nose) 8a which is a portion formed adjacent to the externally-threaded member 7a on an end of the pin 3a and has no threads. The nose 8a has a seal portion 13a on the outer peripheral surface thereof, and a shoulder 14a on the end surface thereof. The box 1a into which the pin 3a is fitted is a portion having an internally-threaded member 5a, a seal portion and a shoulder 12a on the inner surface thereof, and these portions 5a, 11a, and 12a are portions threadedly engaged with or brought into contact with the externally-threaded member 7a, the seal portions 13a and the shoulder 14a of the pin 3a, respectively. In FIG. 3A, a chain line indicates a tube axis.

In the conventional example shown in FIG. 3C, the threaded joint is a so-called pin end seal type premium joint where the seal portions 11a and 13a are positioned at the end portion of the nose 8a. Apart from such a premium joint, there has been also known a radial seal type premium joint where the seal portions 11a and 13a are positioned at an intermediate portion of the nose 8a in a tube axis direction, and the pin 3a and the box 1a are brought into metal-to-metal contact in a tube radial direction.

To install a tube in a well, there may be a situation where the tube is installed while being rotated. In digging a directional well or a horizontal well, the tube is rotated in a state where the pipe is bent during digging. In this case, tensile-compressive forces are repeatedly applied to the tube. Along with the progress of deep wells, the above-mentioned tensile-compressive forces are also increased. Due to such repeated tensile-compressive forces, plastic deformation occurs in a threaded portion and a seal portion of a box which constitutes a threaded joint, and there may be a situation where sealability is lowered or cracks develop resulting in rupture in a worst case.

In view of the above, as a threaded joint structure exhibiting strong resistance against repeated tensile-compressive forces or repeated bending forces, there has been proposed a structure that alleviates stress concentration by arranging a spiral stress relaxation chase on threaded bottoms of one end or both ends of threadedly meshing end portions of either one or both of pin side and box side (see for example, Japanese Patent No. 3401859 (Japanese Patent Application Publication No. 7-98082)).

However, a stress or a strain acting on a threaded corner portion of a box side is not determined only based on the shape of threads and the above-mentioned stress relaxation chase, and the stress or the strain is influenced by the tolerance of a cross-sectional area of a weakest portion of the box with respect to a cross-sectional area of a tube body. Hence, there exists a drawback that the stress concentration at the threaded corner portion of box side cannot be sufficiently alleviated only based on the shape of threads or the arrangement of the stress relaxation chase.

It could therefore be helpful to provide a threaded joint structure where the stress concentration hardly occurs at the threaded corner portion of box side even when the threaded joint receives repeated tensile-compressive forces or repeated bending forces.

SUMMARY

We thus provide:

[1] A threaded joint for tubes including: a pin which includes an externally-threaded member, a nose extending toward a tube end side from the externally-threaded member, and a shoulder formed at an end of the nose; and a box which includes an internally-threaded member which is threadedly joined with the externally-threaded member, a box seal surface which faces a nose outer peripheral surface of the pin in an opposed manner, and a shoulder which is brought into contact with the shoulder of the pin; wherein the threaded joint is of a radial seal type that the nose outer peripheral surface and the box seal surface are brought into metal-to-metal contact in a tube radial direction due to joining of the pin and the box by being threadedly joined, and the contact portion forms a seal portion, a tensile efficiency TE (%) is defined by a ratio $S_c/S_p$ of a cross-sectional area $S_c$ including a portion where a tensile stress and a strain become the highest in a tube circumferential cross section of the box to a cross-sectional area $S_p$ of a tube body, the tensile efficiency TE (%) satisfies formula (1) having a ratio t/ρ of an internally-threaded height t of the box to a radius of curvature ρ of a corner portion on an internally-threaded bottom load surface side:

$$TE(\%) \geq 2.25 \times t/\rho + 99.9 \tag{1}$$

[2] The threaded joint for tubes according to [1], wherein the seal portion of the pin forms an arc which projects toward an outside as viewed in a cross section along a tube axis direction, the seal portion of the box forms a tapered surface which converges in a direction toward the shoulder, and a seal taper angle which the tapered surface makes with a tube axis is set to 2 to 15 degrees.

[3] The threaded joint for tubes according to [2], wherein the seal taper angle is set to 2 to 5 degrees.

According to our threaded joint for tubes, a stress or a strain in the threaded corner portion of box side is decreased. Hence, the stress concentration hardly occurs even when the threaded joint receives repeated tensile-compressive forces or repeated bending forces. The threaded joint has excellent fatigue strength and excellent failure-bearing capability.

BRIEF DESCRIPTION OF THE DRAWINGS

FIGS. 3A, 3B and 3C are schematic views of a cross section in a tube axis direction of the conventional threaded joint.

Figure 1A:
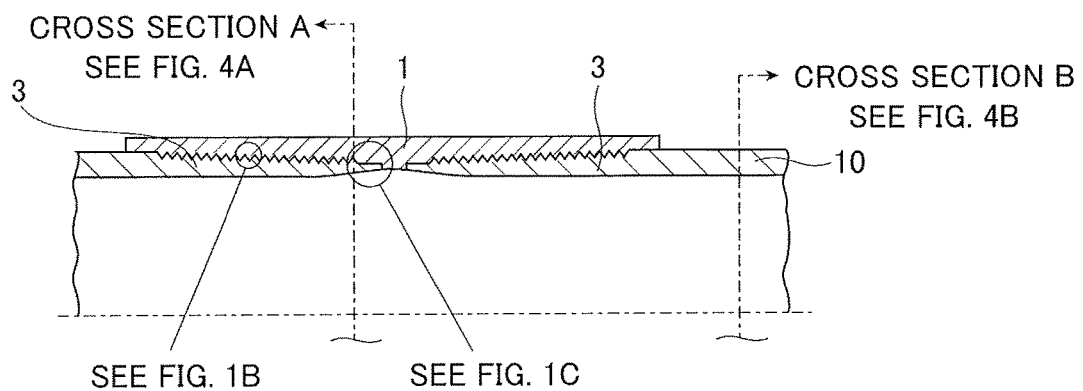
FIGS. 1A, 1B and 1C are schematic views showing a cross section in a tube axis direction of the threaded joint.
Figure 1B:
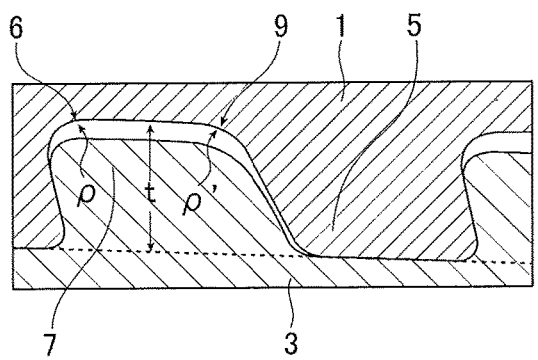
Figure 1C:
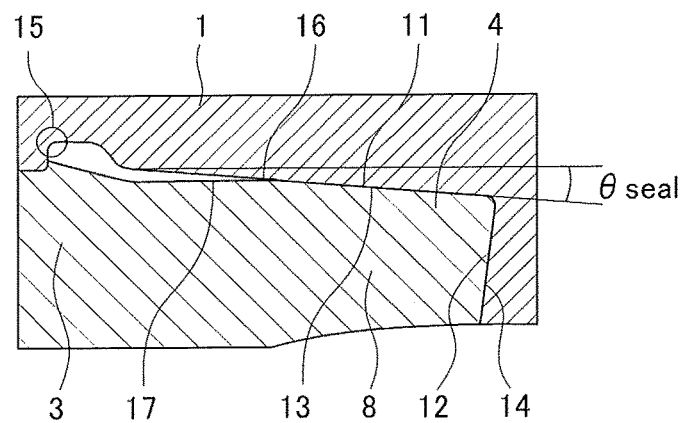

REFERENCE SIGNS LIST 1 box
3 pin
4 metal-to-metal contact
5 internally-threaded member
6 corner portion of internally-threaded bottom load surface side
7 externally-threaded member
8 nose
9 corner portion of internally-threaded bottom insertion surface side
10 tube body
11 seal portion of box
12 shoulder portion of box
13 seal portion of pin
14 shoulder portion of pin
15 portion where a tensile stress and a strain become the highest
16 box seal surface
17 nose outer peripheral surface (pin seal surface)
18 metal-to-metal contact

DETAILED DESCRIPTION

One example is explained by reference to FIGS. 1A to 1C, 2 and 4A and 4B. The threaded joint includes a pin 3 and a box 1. The pin 3 includes an externally-threaded member 7, a nose 8 extending toward an end side from the externally-threaded member 7, and a shoulder 14 formed at an end of the nose 8. The box 1 includes an internally-threaded member 5 threadedly joined with the externally-threaded member 7 thereby forming a threaded portion, a box seal surface 16 facing a nose outer peripheral surface 17 of the pin 3 in an opposed manner and a shoulder 12 in contact with the shoulder 14 of the pins 3. The threaded joint is a radial seal type threaded joint for tube (see FIGS. 1A to 1C) wherein the pin 3 and the box 1 are joined to each other by thread joining so that the nose outer peripheral surface 17 and the box seal surface 16 are brought into metal-to-metal contact in a tube radial direction and the contact portion forms a seal portion (seal portion 13 of the pin 3, seal portion 11 of the box 1). The radial seal type threaded joint is superior to the pin end seal type threaded joint with respect to suppressing an adverse effect which the plastic deformation of the box caused by repeated tensile-compressive forces or repeated bending forces exerts on sealability.

On the premise that the threaded joint is a radial seal type threaded joint, our threaded joint is characterized in that:

Tensile efficiency TE (TE=$(S_c/S_p) \times 100$)(%) (see FIGS. 4A and 4B, here, a double-dashed chain line in FIG. 4A indicates an outer diameter portion of a pin) is defined by a ratio $S_c/S_p$ of a cross-sectional area $S_c$ of a CCS (Critical Cross Section) which is a cross section (cross section A) including a portion 15 where a tensile stress and a strain become the highest in a tube circumferential cross section of the box 1 to a cross-sectional area $S_p$ of a tube body 10; and The tensile efficiency TE satisfies formula (1) having a ratio t/ρ between an internal thread height t of the box 1 and a radius of curvature ρ (see FIG. 1B) of a corner portion 6 of internally-threaded bottom load surface side:

$$TE(\%) \geq 2.25 \times t/\rho + 99.9 \tag{1}$$

Figure 2:
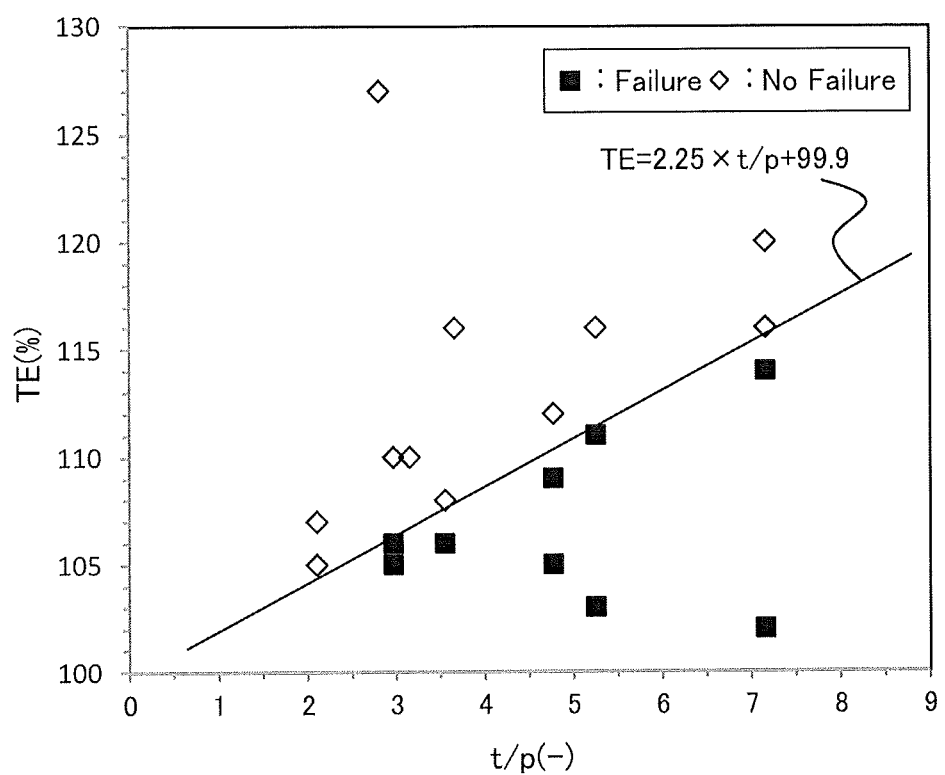
FIG. 2 is a graph showing validity of formula (1).
Figure 4A:
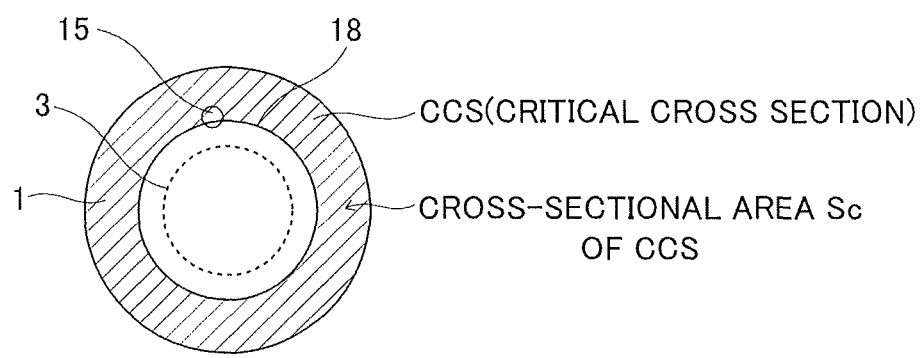
FIGS. 4A and 4B are schematic views of a cross section in a tube axis direction of the threaded joint showing the definition of tensile efficiency TE.
Figure 4B:
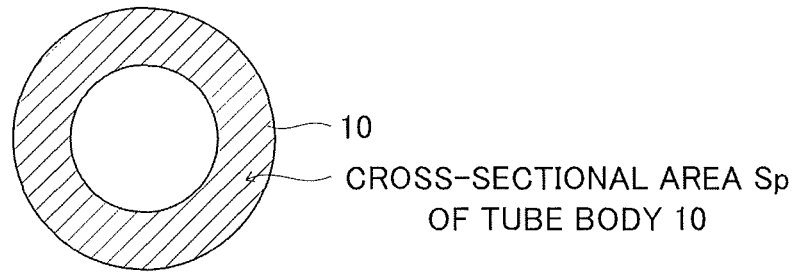

A region of TE and t/ρ that satisfies formula (1) is a right side of the straight line expressed by the formula TE=2.25×t/ρ+99.9 in FIG. 2 where TE is taken on an axis of abscissas and t/ρ is taken on an axis of ordinates. Within this region, plotted dots indicating "NO FAILURE" (no leakage in the sealability test described later and no failure in the repeated load test described later) are positioned. On the other hand, outside this region, plotted dots indicating "FAILURE" (leakage in the sealability test described later or failure in the repeated load test described later) are positioned. Accordingly, it is understood that formula (1) has validity.

In the box 1, portions where the largest amount of strain generated by plastic deformation is accumulated are a plurality of corner portions 6 of internally-threaded bottom load surface side (corner portions formed by a load surface and an internally-threaded bottom surface of the internally-threaded member 5 of the box 1). Portions where the next largest amount of strain is accumulated are a plurality of corner portions 9 of internally-threaded bottom insertion surface side (corner portions formed by an insertion surface and the internally-threaded bottom surface of the internally-threaded member 5 of the box 1) (see FIG. 1B). The reduction of strain in these portions is important to prevent abnormal deformation or failure at the time of installing a tube in a directional well or in a horizontal well.

We extensively carried out stress-strain calculations under a tensile-compressive load state using an FEA (Finite Element Analysis) and repeated load test of tensile-compressive forces by changing the radial seal type thread joint into various shapes, and found the following.

That is, by designing and manufacturing the threaded joint such that a tensile efficiency TE (%) defined by a ratio Sc/Sp of a cross-sectional area Sc of a CCS of the box 1 to a cross-sectional area Sp of the tube body 10 (see FIGS. 4A and 4B) satisfies formula (1) having a ratio t/ρ between an internal thread height t of the box 1 and a radius of curvature ρ of a corner portion 6 on an internally-threaded bottom load surface side, it is possible to suppress an initial crack occurring at a corner portion of a threaded bottom (corner portion 6 of internally-threaded bottom load surface side or corner portion 9 of internally-threaded bottom insertion surface side) of the box 1 and may become an initiation point of fatigue failure or rupture over the whole cross section of the box 1.

The position of the above-mentioned CCS in the tube axis direction can be identified by the first thread of nose side or by numerical calculation using an FEA. The CCS is a cross section in which a tensile force is transmitted to the box by way of a threaded portion when the tensile force is applied to the tube body 10 and exhibits the largest average stress. The tensile efficiency TE is defined by a ratio Sc/Sp of the cross-sectional area Sc of the CCS to the cross-sectional area Sp of the tube body 10. In general, however, the CCS is simply set to 100% or more regardless of t/ρ. Although the increase of the tensile efficiency TE is effective in decreasing average tensile stress and strain in the CCS, even when TE is simply increased to 100% or more, it is difficult to decrease the stress concentration on the internally-threaded member when the threaded joint receives repeated tensile-compressive forces or repeated bending forces. To decrease the above-mentioned stress concentration or the strain concentration, it is necessary to design and manufacture a threaded joint for tube such that TE and t/ρ satisfy formula (1).

The larger a radius of curvature ρ of the corner portion 6 of internally-threaded bottom load surface side, the more effectively the accumulation of strain can be prevented. However, when the radius of curvature ρ is excessively large, the corner portion 6 of internally-threaded bottom load surface side is brought into contact with an externally-threaded member load surface of pin 3 side facing the corner portion 6 in an opposed manner. Hence, a straight line portion receiving a tensile load becomes insufficient whereby plastic deformation may occur locally. Accordingly, it is preferable to set the radius of curvature ρ to 0.3 to 1.0 mm. It is also preferable to set a radius of curvature ρ' of the corner portion 9 of internally-threaded bottom insertion surface side to 0.3 to 1.5 mm for the same reason.

As described previously, the radial seal type threaded joint is superior to the pin end seal type threaded joint with respect to an effect of suppressing an adverse effect which the plastic deformation of the box caused by repeated tensile-compressive forces or repeated bending forces exerts on sealability. Accordingly, our threaded joint is a radial seal type threaded joint. Particularly preferable is a threaded joint where the seal portion 13 of the pin 3 is formed into a projecting curved surface as viewed in cross section in a tube axis direction, and the seal portion 11 of the box 1 facing the seal portion 13 of the pin 3 in an opposed manner is formed into a tapered surface converging toward the shoulder 12, wherein a seal taper angle $\theta_{seal}$ (see FIG. 1C) which is an angle that the taper surface makes with a tube axis is set to 15 degrees or less, and more preferably 5 degrees or less. On the other hand, when the seal taper angle $\theta_{seal}$ is excessively small, a slide distance of the seal portion during the made-up is increased, hence, galling is induced. Accordingly, it is preferable to set the seal taper angle $\theta_{seal}$ to 2 degrees or more.

The projecting curved surface is a curved surface forming a curved line in cross section along a tube axis direction, a line segment connecting both ends of a region of the curved line in the tube axis direction is positioned in the inside of the pin body, and in which any point within the region of the curved line approaches the tube axis as the point approaches the tube end. The above-mentioned curved line may be formed by connecting a plurality of arcs differing in curvature directly or by way of line segments such that the arcs have a common tangent line. The above-mentioned tapered surface is a pyramidal surface where the tapered surface forms a straight line in cross section in the tube axis direction, and all points within the straight line approach the tube axis as these points approach the shoulder 12.

Further, while setting a shape of threads and a shape of the joint in the above-mentioned scope, by further applying shot blasting to a surface of the internally-threaded member 5 of the box 1, a compressive residual stress is applied to the internally-threaded member 5 thus decreasing the maximum value of tensile stress, it is possible to acquire an effect of suppressing crack initiation and an effect of extending fatigue life. Further, when electroplating is applied to either one or both surfaces of box side and pin side of sliding surfaces between the box 1 and the pin 3 to prevent galling, plating time may be excessively long so that hydrogen excessively intrudes into and is trapped in the steel of which the threaded joint is made thus giving rise to a risk of rupture due to trapped hydrogen. To eliminate this risk, it is also preferable to apply baking stipulated in ISO 9588 after applying plating, for example.

EXAMPLE

By forming a chromium-based steel tube having an outer diameter of 244.475 mm and a wall thickness of 13.84 mm and a coupling material for the chromium-based steel tube, a pin 3 having a seal portion 13 formed into an outwardly projecting arc (arc having a secant in the inside of pin) as viewed in cross section along a tube axis direction was designed and manufactured using the above-mentioned chromium-based steel tube, and a box 1 having a seal portion 11 formed into a tapered surface converging in the direction toward a shoulder 12 was designed and manufactured using the above-mentioned coupling material. Threaded joints for tube constituted of the above-mentioned pin 3 and the above-mentioned box 1 were manufactured. Various data on design conditions are shown in Table 1.

In Table 1, a shoulder angle is an angle of acute angle side which a shoulder face formed by the shoulders 12 and 14 during the made-up makes with a plane orthogonal to a tube axis.

A threaded joint manufactured using a chromium-based steel tube has a high risk of galling compared to a threaded joint manufactured by using a carbon-based steel. Hence, electroplating was applied to a surface of an internally-threaded member 5 and a box seal surface 16 of the box 1. A make and break test was carried out repeatedly 10 times with respect to these threaded joints. After confirming that galling is not present, test series A stipulated in ISO 13679 was carried out under a condition of 100% compression, and the presence or the non-presence of leakage was checked. Further, with respect to the threaded joints in which leakage was not present, to simulate repeated bending forces, a repeated load test which repeatedly applies tensile-compressive forces 100 times was carried out. Results of these tests are shown in Table 1 and FIG. 2. Plotted dots (FAILURE, NO FAILURE) shown in FIG. 2 have the meaning described previously.

As can be clearly understood from Table 1 and FIG. 2, our examples (NO FAILURE in FIG. 2) where TE and t/ρ fall within a range in which formula (1) is satisfied exhibit no leakage in the test series A and no rupture in the repeated load test. To the contrary, the comparison examples (Failure in FIG. 2) where TE and t/ρ do not fall within a range in which formula (1) is satisfied exhibit leakage in the test series A or rupture in the repeated load test before the repeated load reaches 100 times even without leakage.

As can be understood from these results, stress-strain in the threaded corner portion of the box 1 can be decreased and, hence, fatigue strength and failure-bearing capability of the threaded joint for tube can be enhanced.

TABLE 1

| No. | ρ (mm) | t (mm) | t/ρ (—) | TE (%) | Seal Taper Angle (degree) | Shoulder Angle (degree) | Result of test series A | Result of Repeated Load Test | Remarks |
|---|---|---|---|---|---|---|---|---|---|
| 1 | 0.22 | 1.575 | 7.16 | 120 | 3.5 | 17 | leak not found | no failure | our example |
| 2 | 0.22 | 1.575 | 7.16 | 116 | 3.5 | 17 | leak not found | no failure | our example |
| 3 | 0.43 | 1.575 | 3.66 | 116 | 3.5 | 17 | leak not found | no failure | our example |
| 4 | 0.50 | 1.575 | 3.15 | 110 | 3.5 | 15 | leak not found | no failure | our example |
| 5 | 0.60 | 1.778 | 2.96 | 110 | 4.7 | 10 | leak not found | no failure | our example |
| 6 | 0.42 | 1.179 | 2.81 | 127 | 4.7 | 10 | leak not found | no failure | our example |
| 7 | 0.33 | 1.575 | 4.77 | 112 | 3.5 | 15 | leak not found | no failure | our example |
| 8 | 0.30 | 1.575 | 5.25 | 116 | 3.5 | 15 | leak not found | no failure | our example |
| 9 | 1.50 | 3.150 | 2.10 | 105 | 9.5 | 15 | leak not found | no failure | our example |
| 10 | 1.50 | 3.150 | 2.10 | 107 | 9.5 | 15 | leak not found | no failure | our example |
| 11 | 0.33 | 1.575 | 4.77 | 105 | 12 | 15 | leak not found | failure at 52nd time | comparison example |
| 12 | 0.33 | 1.575 | 4.77 | 109 | 12 | 15 | leak not found | failure at 68th time | comparison example |
| 13 | 0.30 | 1.575 | 5.25 | 111 | 12 | 15 | leak not found | failure at 87th time | comparison example |
| 14 | 0.22 | 1.575 | 7.16 | 114 | 12 | 15 | leak not found | failure at 65th time | comparison example |
| 15 | 0.60 | 1.778 | 2.96 | 105 | 12 | 10 | leak not found | failure at 75th time | comparison example |
| 16 | 0.50 | 1.778 | 3.56 | 106 | 12 | 10 | leak not found | failure at 73rd time | comparison example |
| 17 | 0.60 | 1.778 | 2.96 | 106 | 12 | 10 | leak not found | failure at 91st time | comparison example |
| 18 | 0.30 | 1.575 | 5.25 | 103 | 12 | 15 | leak found | — | comparison example |
| 19 | 0.22 | 1.575 | 7.16 | 102 | 12 | 15 | leak found | — | comparison example |

The invention claimed is:

1. A threaded joint for tubes forming a tube body comprising:
   a pin including an externally-threaded member, a nose extending toward a tube end side from the externally-threaded member, and a shoulder formed at an end of the nose; and
   a box including an internally-threaded member threadedly joined with the externally-threaded member, a box seal surface facing a nose outer peripheral surface of the pin in an opposed manner, and a shoulder brought into contact with the shoulder of the pin; wherein
   the threaded joint is a radial seal that the nose outer peripheral surface and the box seal surface are brought into metal-to-metal contact in a tube radial direction as a result of joining of the pin and the box by being threadedly joined, and the contact portion forms a seal portion, and
   tensile efficiency TE (%) is defined by a ratio $S_c/S_p$ of a cross-sectional area $S_c$ including a portion where tensile stress and strain become highest in a tube circumferential cross section of the box to a cross-sectional area $S_p$ of the tube body,
   the tensile efficiency TE (%) satisfies formula (1) having a ratio t/ρ of an internally-threaded height t of the box to a radius of curvature ρ of a corner portion on an internally-threaded bottom load surface side:

$$TE(\%) \geq 2.25 \times t/\rho + 99.9 \qquad (1).$$

2. The threaded joint according to claim 1, wherein a seal portion of the pin forms an arc projecting toward an outside as viewed in a cross section along a tube axis direction,
   a seal portion of the box forms a tapered surface converging in a direction toward the shoulder, and
   a seal taper angle which the tapered surface makes with a tube axis is 2 to 15 degrees.

3. The threaded joint according to claim 2, wherein the seal taper angle is 2 to 5 degrees.

\* \* \* \* \*